(12) United States Patent
Fujikawa et al.

(10) Patent No.: US 8,766,879 B2
(45) Date of Patent: Jul. 1, 2014

(54) HEAD-UP DISPLAY APPARATUS

(75) Inventors: Takayuki Fujikawa, Nagoya (JP);
Kazuto Fukasawa, Toyoake (JP);
Hideaki Imahori, Kariya (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 13/551,716

(22) Filed: Jul. 18, 2012

(65) Prior Publication Data
US 2013/0021224 A1 Jan. 24, 2013

(30) Foreign Application Priority Data
Jul. 24, 2011 (JP) .................................. 2011-161466

(51) Int. Cl.
*G09G 5/00* (2006.01)

(52) U.S. Cl.
USPC ......... 345/7; 345/8; 359/13; 359/630; 349/11

(58) Field of Classification Search
USPC .......... 345/7–8; 359/13–14, 630–631; 349/11
See application file for complete search history.

(56) References Cited

U.S. PATENT DOCUMENTS

| 4,348,187 A * | 9/1982 | Dotsko ........................... 434/44 |
| 4,509,835 A * | 4/1985 | Adler .............................. 352/43 |
| 4,711,544 A | 12/1987 | Iino et al. |
| 5,760,931 A | 6/1998 | Saburi et al. |
| 7,663,793 B1 * | 2/2010 | Doucet ....................... 359/212.1 |
| 2008/0278822 A1 | 11/2008 | Choi et al. |
| 2011/0128602 A1 | 6/2011 | Hamano et al. |
| 2013/0027426 A1 * | 1/2013 | Sasaki et al. .................. 345/629 |

FOREIGN PATENT DOCUMENTS

| JP | H04-034126 | 3/1992 |
| JP | H06-067154 | 9/1994 |
| JP | 07-257225 | 10/1995 |
| JP | 10-149085 | 6/1998 |
| JP | 11-030764 | 2/1999 |
| JP | 2010-049232 | 3/2010 |
| KR | 2008/0278822 | 11/2008 |
| WO | WO94/14098 | 6/1994 |

OTHER PUBLICATIONS

Office action dated Oct. 29, 2013 in corresponding Korean Application No. 10-2012-80087.
Office Action issued May 28, 2013 in corresponding Japanese Application No. 2011-161466 (with English translation).

* cited by examiner

*Primary Examiner* — Jennifer Nguyen
(74) *Attorney, Agent, or Firm* — Harness, Dickey & Pierce, PLC (57) ABSTRACT

A display image to be projected onto a projection surface is formed on an imaging surface of a screen member at time of projecting the display image onto the projection surface. A projector is adapted to project a light, which forms the display image on the imaging surface. The imaging surface is formed as a convex surface that limits a curvature of field of the virtual image.

10 Claims, 9 Drawing Sheets

| | DISTANCE, THICKNESS (mm) | LIGHT INPUT/ OUTPUT ANGLE (DEGREE) | SIZE (mm) | MATERIAL | POLYNOMIAL COEFFICIENT |
|---|---|---|---|---|---|
| CONVEX IMAGING SURFACE | −150 | y-z PLANE: 20 | 60 × 20 | MIRROR | $x^2$: 0.00971 |
| CONCAVE MIRROR | 250 | y-z PLANE: −20 | 260 × 80 | MIRROR | $x^2$: 0.00140, $y^2$: 0.000893, $x^2y$: −7.12 × 10$^{-7}$, $y^3$: −1.38 × 10$^{-7}$ |
| WINDSHIELD | −800 | y-z PLANE: −60 | 400 × 400 | GLASS | $x^2$: −0.0001, $y^2$: −0.0001 |
| EYE BOX | 2000 | 0 | 100 × 50 | — | — |
| VIRTUAL IMAGE | — | — | 360 × 90 | — | — |

FIG. 9

| | DISTANCE, THICKNESS (mm) | LIGHT INPUT/ OUTPUT ANGLE (DEGREE) | SIZE (mm) | MATERIAL | POLYNOMIAL COEFFICIENT |
|---|---|---|---|---|---|
| PLANAR IMAGING SURFACE | -150 | y-z PLANE: 20 | 60×20 | MIRROR | — |
| CONCAVE MIRROR | 250 | y-z PLANE: -20 | 260×80 | MIRROR | $x^2$:0.00143, $y^2$:0.000948, $x^2y$:-8.83×10$^{-7}$, $y^3$:-2.51×10$^{-7}$ |
| WINDSHIELD | -800 | y-z PLANE: -60 | 400×400 | GLASS | $x^2$:-0.0001, $y^2$:-0.0001 |
| EYE BOX | 2000 | 0 | 100×50 | — | — |
| VIRTUAL IMAGE | — | — | 360×90 | — | — |

FIG. 10

| | IMAGING SURFACE OF SCREEN | |
|---|---|---|
| | CONVEX SURFACE | PLANAR SURFACE |
| SPOT DIAMETER (μm) IN CENTER PORTION | 365 | 1436 |
| MAXIMUM SPOT DIAMETER (μm) | 491 | 2813 |

FIG. 11

| | DISTANCE, THICKNESS (mm) | LIGHT INPUT/ OUTPUT ANGLE (DEGREE) | SIZE (mm) | MATERIAL | POLYNOMIAL COEFFICIENT |
|---|---|---|---|---|---|
| SCANNER (MEMS MIRROR) | 20 | x-z PLANE: 20<br>x-z PLANE: ±8.3<br>y-z PLANE: ±5.7 | 1.5 × 1.5 | MIRROR | — |
| FREE-FORM-SURFACE LENS | 250 | 0 | 10 × 5 | BK7 | $x^2: 2.98 \times 10^{-5}$, $y^2: -0.00134$,<br>$y^3: -9.87 \times 10^{-5}$, $x^4: -9.64 \times 10^{-65}$,<br>$y^4: 5.35 \times 10^{-7}$ |
| CONVEX IMAGING SURFACE | −800 | y-z PLANE: 20 | 60 × 20 | MIRROR | $x^2: 0.00971$ |
| EYE BOX | 2000 | 0 | 100 × 50 | — | — |
| VIRTUAL IMAGE | — | — | 360 × 90 | — | — |

FIG. 12

| | FREE-FORM-SURFACE LENS | |
|---|---|---|
| | PRESENT | ABSENT |
| SPOT DIAMETER ($\mu$m) IN CENTER PORTION | 13.7 | 0.0 |
| MAXIMUM SPOT DIAMETER ($\mu$m) | 22.0 | 85.1 |

HEAD-UP DISPLAY APPARATUS

CROSS REFERENCE TO RELATED APPLICATION

This application is based on and incorporates herein by reference Japanese Patent Application No. 2011-161466 filed on Jul. 24, 2011.

TECHNICAL FIELD

The present disclosure relates to a head-up display apparatus.

BACKGROUND

In a field of a head-up display apparatus of a vehicle, it is known that aberrations, which are generated in an optical system including a windshield of the vehicle, cause deformation of an image, which is displayed as a virtual image. One of the aberrations of the optical system is an aberration caused by a distortion of the image. A technique of reducing a two-dimensional deformation of the virtual image, which is caused by the distortion, is disclosed in, for example, JPH07-257225A, JPH10-149085A and JPH11-30764A.

Specifically, JPH07-257225A teaches a holographic display system, which includes a light emitting display means and a reflective hologram. The light emitting display means projects a light of a virtual image. The light, which is outputted from the light emitting display means, is projected onto the reflective hologram. A shape of the display image, which is projected by the light emitting display means, is pre-deformed (pre-distorted) in advance to compensate the deformation generated at the reflective hologram. Thus, it is possible to limit the two-dimensional deformation of the displayed virtual image.

JPH10-149085A teaches a holographic display apparatus, which includes a display, a light source and a hologram combiner. The display projects a light, which forms a display image. The light, which is outputted from the display, is projected onto the hologram combiner. A shape of the display image, which is projected by the display, is pre-deformed (pre-distorted) in advance to compensate the two-dimensional deformation of the image generated at the hologram combiner. Thus, it is possible to limit the two-dimensional deformation of the displayed image.

JPH11-30764A teaches a head-up display apparatus, which includes an image display surface and a half mirror. A light of an image is projected from the image display surface. The light, which is outputted from the image display surface, is projected onto the half mirror. The image, which is projected from the image display surface, is pre-deformed (pre-distorted) in advance to compensate a deformation of the image generated at the half mirror. Thus, it is possible to limit the two-dimensional deformation of the virtual image.

Lately, like in the case of JPH11-30764A, it is popular to use the head-up display apparatus, which projects a display image onto a concave windshield located on a front side of a viewer. In such a head-up display apparatus, in addition to the aberration caused by the two-dimensional deformation of the image, an aberration caused by a three-dimensional curvature of field occurs. Therefore, the displayed virtual image of the display image, which is viewed at a viewing area by a viewer, is deformed such that a distance between the viewing area of the viewer and the displayed virtual image decreases from a center portion of the displayed virtual image to an edge portion of the displayed virtual image.

In the head-up display apparatus of JPH11-30764A, the image display surface, which displays the display image, is formed as a planar surface. In addition, in general, it is difficult to change the shape of such an image display surface. Therefore, it is difficult to adjust a distance of a light path, which is from the image display surface to the windshield, and an imaging point of the virtual image. As a result, the three-dimensional deformation of the virtual image cannot be reduced. In the case where the three-dimensional deformation is generated in the virtual image, when the viewer moves his/her view point within the viewing area, a change in the shape and a change in the position occur in the virtual image of the display image. Therefore, the display quality of the display image, which is displayed as the virtual image, may possibly become insufficient.

SUMMARY

The present disclosure is made in view of the above disadvantages.

According to the present disclosure, there is provided a head-up display apparatus, which is adapted to project a display image onto a projection surface of a display member to enable a viewer to view a virtual image of the display image from a predetermined viewing area. The head-up display apparatus includes a screen member and a projector. The screen member includes an imaging surface, on which the display image to be projected onto the projection surface is formed at time of projecting the display image onto the projection surface. The projector is adapted to project a light, which forms the display image on the imaging surface. The imaging surface is formed as a convex surface that limits a curvature of field of the virtual image.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described with reference to the accompanying drawings.

Figure 1:
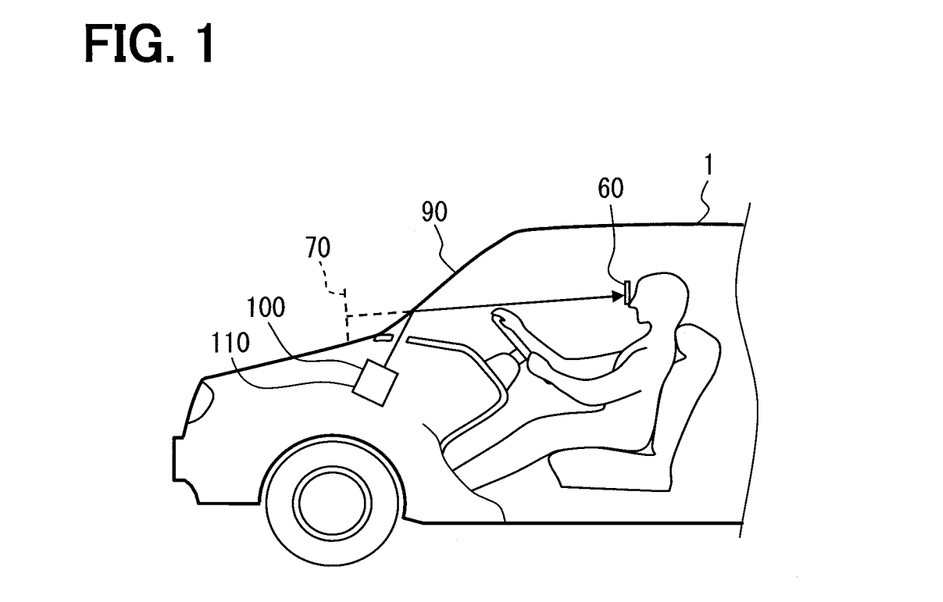
FIG. 1 is a schematic view showing a vehicle, in which a head-up display apparatus of an embodiment of the present disclosure is installed.
Figure 2:
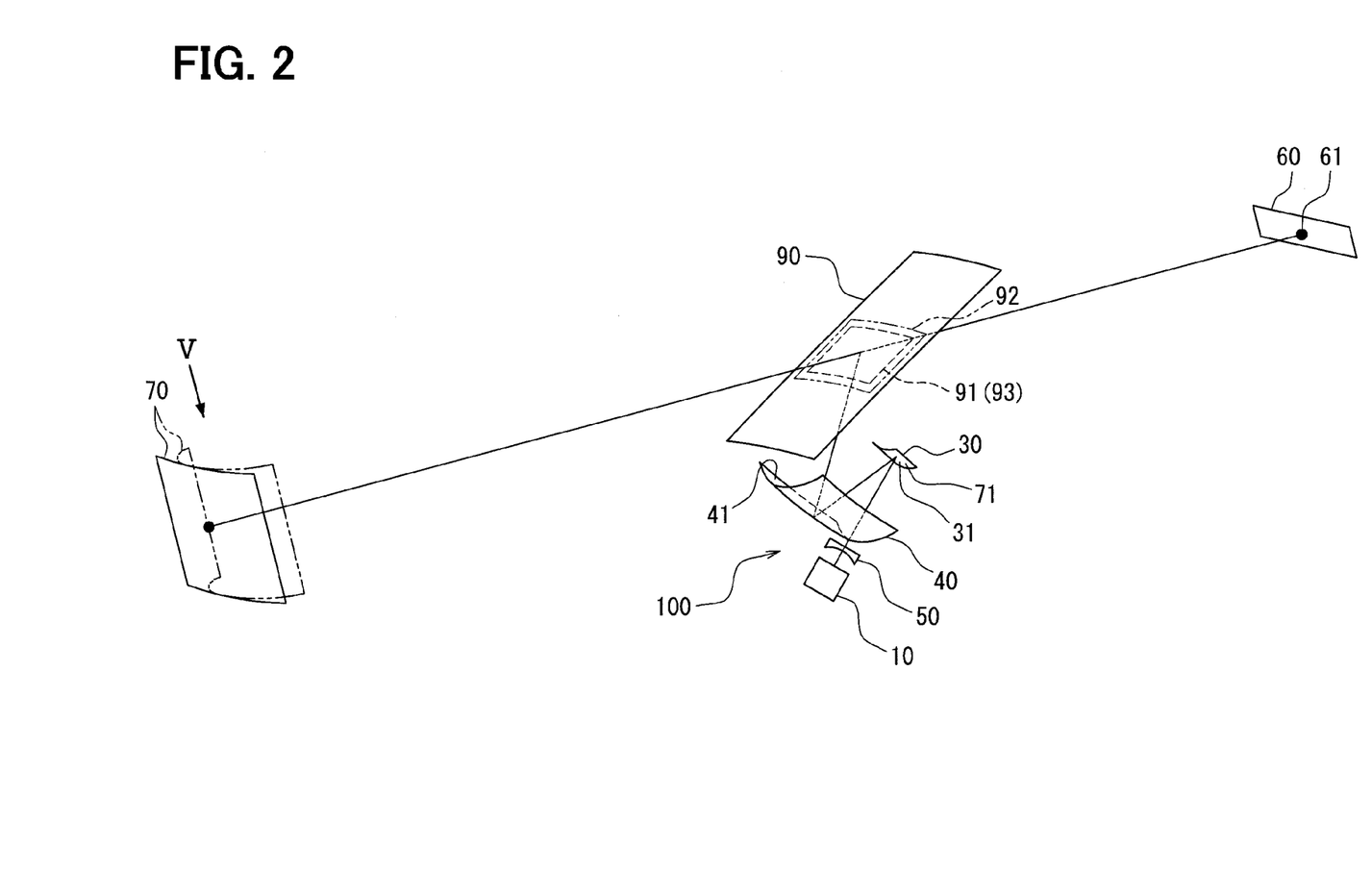
FIG. 2 is a diagram showing an arrangement of the head-up display apparatus of the embodiment in the vehicle.
Figure 3:
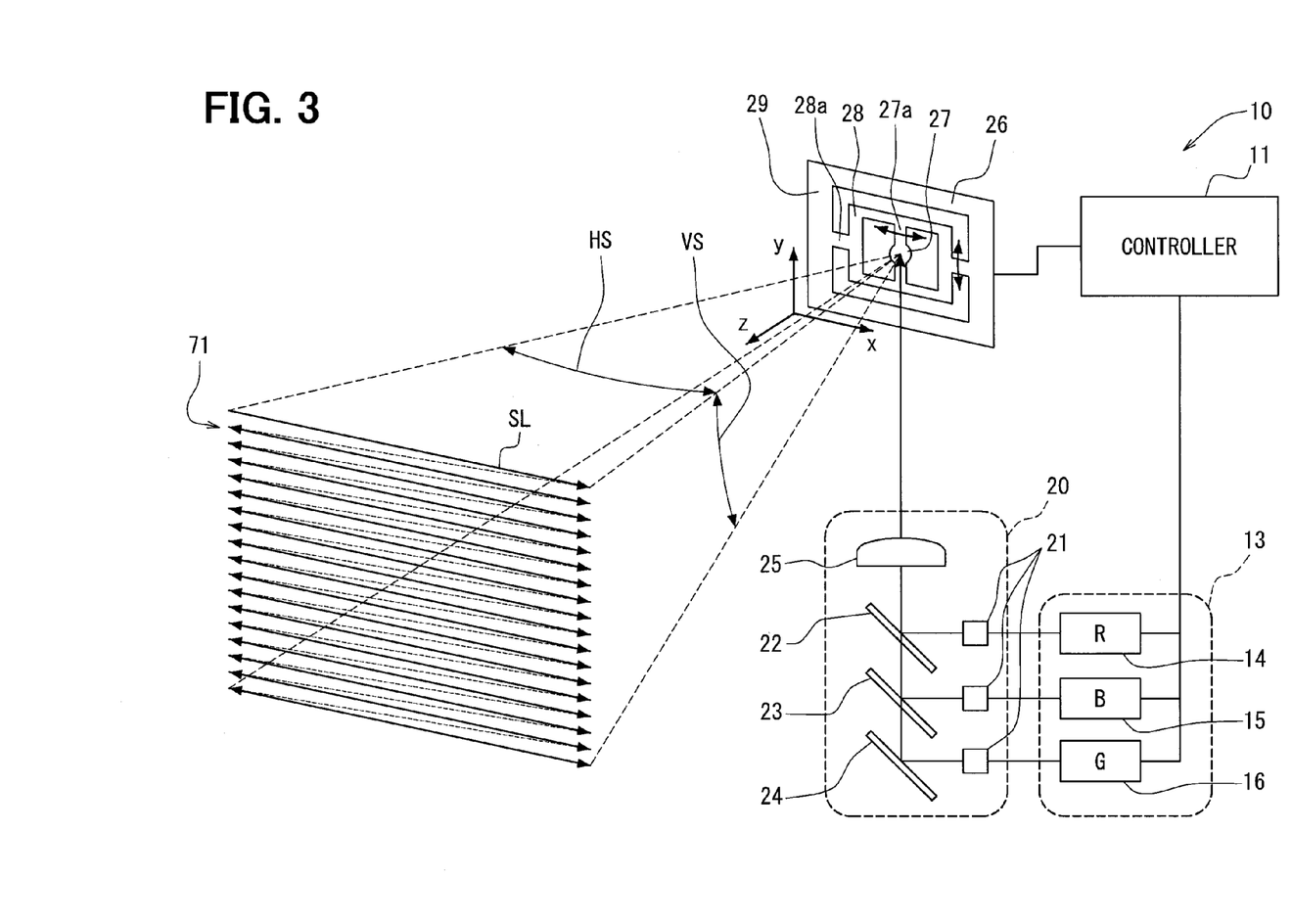
FIG. 3 is a diagram showing a structure of a laser scanner of the head-up display apparatus of the embodiment.

With reference to FIGS. 1 to 3, a head-up display apparatus 100 of an embodiment of the present disclosure is received in, for example, an instrument panel of a vehicle (an automobile in this instance) 1. A display image 71 is projected from the head-up display apparatus 100 onto a windshield (a display member) 90 of the vehicle 1, so that a driver (viewer) can visually recognize a virtual image 70 of the display image 71 from a predetermined eye box 60. A projection surface (also referred to as a surface of projection) 91, onto which the display image 71 is projected from the head-up display apparatus 100, is formed in a vehicle interior side surface of the windshield 90 and is formed as a concave surface, which is concave, i.e., is curved and is recessed in a direction away from the viewer (and thereby away from the eye box 60 of the viewer). The light of the display image 71, which is projected onto the projection surface 91, is reflected by the projection surface 91 toward the eye box 60 and reaches an eye point 61 of the driver (the viewer). The viewer who perceives the light of the display image 71 can visually recognize, i.e., can view the virtual image 70 of the display image 71, which is formed on the front side of the windshield 90 (i.e., the side of the windshield 90, which is opposite from the viewer).

The display image 71, which is projected onto the projection surface 91, is configured into an elongated rectangular form (an oblong form) that has a horizontal length, which is measured in a horizontal direction (a left-to-right direction) of the vehicle and is larger than a vertical length of the display image 71 measured in a vertical direction of the vehicle. This is because of that the movement of the eye point 61 is easier in the horizontal direction than the vertical direction when the viewer is seated on his/her seat in the vehicle. The display image 71 includes image segments indicating, for example, a traveling speed of the vehicle having the head-up display apparatus 100, an image of a traveling direction sign of the vehicle, which is specified by the navigation system, and a warning sign(s) of the vehicle.

Now, a structure of the head-up display apparatus 100 will be described with reference to FIGS. 2 and 3. The head-up display apparatus 100 includes a laser scanner 10, a screen 30 and a concave mirror 40, which are received in a housing 110 (FIG. 1). In the following description, an axis of the horizontal direction (also referred to as a lateral direction or a first direction) of the virtual image 70, which is viewed by the viewer, will be referred to as an x-axis. Furthermore, an axis of the vertical direction (also referred to as a top-to-bottom direction or a second direction) of the virtual image 70, which is perpendicular to the horizontal direction, will be referred to as a y-axis. Also, in the following description, for the sake of convenience, the direction of the x-axis of the display image 71, which is formed on or projected onto each corresponding component, will be referred to as the horizontal direction (also referred to as the lateral direction or the first direction), and the direction of the y-axis of the display image 71, which is formed on or projected onto each corresponding component, will be referred to as the vertical direction (also referred to as the top-to-bottom direction or the second direction).

The laser scanner 10 includes a light source 13, an optical device 20, a micro electro mechanical systems (MEMS) mirror 26 and a controller 11.

The light source 13 includes three laser projecting devices 14-16. Each of the laser projecting devices 14-16 projects a corresponding laser light (also referred to as a laser beam) that has a frequency, which is different from that of the other two of the laser projecting devices 14-16, i.e., the corresponding laser light that has a color phase, which is different from that of the other two of the laser projecting devices 14-16. Specifically, the laser projecting device 14 projects the laser light of a red color. The laser projecting device 15 projects the laser light of a blue color. The laser projecting device 16 projects the laser light of a green color. When the laser lights of the different color phases are additively mixed, various colors can be reproduced. Each laser projecting device 14-16 is connected to the controller 11. Each laser projecting device 14-16 projects the laser light of the corresponding color phase based on a control signal outputted from the controller 11.

The optical device 20 includes three collimator lenses 21, three dichroic filters 22-24 and a condenser lens 25. Each collimator lens 21 is placed on a downstream side of the corresponding laser projecting device 14-16 in the projecting direction of the laser light, which is projected from the laser projecting device 14-16. The collimator lens 21 generates parallel rays of light by bending the laser light.

Each dichroic filter 22-24 is placed on a downstream side of the corresponding collimator lens 21 in the projecting direction of the laser light, which is projected from the corresponding laser projecting device 14-16. Each dichroic filter 22-24 reflects a light of a predetermined corresponding frequency and passes lights of other frequencies, which are other than the predetermined corresponding frequency. Specifically, the dichroic filter 22, which is placed on the downstream side of the laser projecting device 14, reflects the light of the frequency of the red color and passes the other lights of the other frequencies that are other than the frequency of the red color. The dichroic filter 23, which is placed on the downstream side of the laser projecting device 15, reflects the light of the frequency of the blue color and passes the other lights of the other frequencies that are other than the frequency of the blue color. The dichroic filter 24, which is placed on the downstream side of the laser projecting device 16, reflects the light of the frequency of the green color and passes the other lights of the other frequencies that are other than the frequency of the green color. Each dichroic filter 22-24 reflects the corresponding laser light toward the condenser lens 25.

The condenser lens 25 is a plano-convex lens, which has a light input surface formed as a planar surface and a light output surface formed as a convex surface. The condenser lens 25 converges the light by bending the laser light, which enters the light input surface of the condenser lens 25. Thereby, the laser light, which has passed through the condenser lens 25, is focused on an imaging surface 31 of the screen 30, which will be described later.

The MEMS mirror 26 is connected to the controller 11 and is configured generally into a rectangular plate form. The MEMS mirror 26 includes an outer frame portion 29, an inner frame portion 28 and a mirror portion 27.

The outer frame portion 29 is configured into a rectangular frame form, which surrounds an outer peripheral part of the inner frame portion 28 and an outer peripheral part of the mirror portion 27. The outer frame portion 29 is securely held by the housing of the laser scanner 10. The inner frame portion 28 is placed on an inner side of the outer frame portion 29 and is configured into a rectangular frame form. The inner frame portion 28 is supported by the outer frame portion 29 through two low speed pivots 28a, which extend in the horizontal direction. The inner frame portion 28 is rotatable (pivotable, i.e., swingable) about the low speed pivots 28a (more specifically, about the axis of the low speed pivots 28a). A plurality of undepicted electrodes (a group of electrodes) is provided between the outer frame portion 29 and the inner frame portion 28 to rotate the inner frame portion 28 about the low speed pivots 28a.

The mirror portion 27 is placed at the inner side of the inner frame portion 28 and is configured into circular disk form. A metal film is formed on a surface of the mirror portion 27, which is opposed to the optical device 20, by vapor deposition of, for example, aluminum to reflect the light at a high efficiency. The mirror portion 27 is supported by the inner frame portion 28 by two high speed pivots 27a, each of which extends in the vertical direction. The mirror portion 27 is rotatable (pivotable, i.e., swingable) about the high speed pivots 27a (more specifically, about the axis of the high speed pivots 27a). A plurality of undepicted electrodes (a group of electrodes) is provided between the inner frame portion 28 and the mirror portion 27 to rotate the mirror portion 27 about the high speed pivots 27a. In the MEMS mirror 26, which is constructed in the above-described manner, the group of electrodes provided between the outer frame portion 29 and the inner frame portion 28 and the group of electrodes provided between the inner frame portion 28 and the mirror portion 27 are driven based on a drive signal that is outputted from the controller 11. Thereby, the orientation of the mirror portion 27 can be adjusted in the vertical direction (see a direction VS in FIG. 3) and the horizontal direction (see a direction HS in FIG. 3).

The controller 11 is an electronic control device, which includes a processor and is connected to the laser projecting devices 14-16 and the MEMS mirror 26. The controller 11 outputs the control signal to each laser projecting device 14-16 to blink the laser light like a pulsed light. In addition, the laser controller 11 outputs the drive signal to the MEMS mirror 26 to control the direction of the reflected laser light, which is reflected by the mirror portion 27, such that the reflected laser light, which is reflected by the mirror portion 27, forms a scanning line SL shown in FIG. 3.

The controller 11 controls the laser scanner 10 such that the laser scanner 10 projects the light, which forms the display image 71 on the imaging surface 31 of the screen 30. Specifically, by scanning the projected blinking laser light, the display image 71, each pixel of which is formed by the corresponding blinking laser light, is formed on the imaging surface 31 of the screen 30. The display image 71, which is formed by the scanning of the laser scanner 10, is an image that has, for example, 60 frames per second and 480 pixels in the horizontal direction (the x-axis) and 240 pixels in the vertical direction (the y-axis).

The screen 30 is a reflective screen (a screen of a reflective type), which is formed by, vapor deposition of, for example, aluminum on a surface of a substrate made of, for example, glass. The screen 30 is placed on the upper side of the laser scanner 10 in the vertical direction of the vehicle (see FIG. 4). The screen 30 has the imaging surface 31. The imaging surface 31 is formed by a metal film of, for example, aluminum that is vapor deposited on the screen 30. The display image 71 is formed on the imaging surface 31 when the laser light is projected from the laser scanner 10 along a y-z plane, which is defined by the y-axis and a z-axis (see FIG. 4). The z-axis is perpendicular to both of the x-axis and the y-axis. The imaging surface 31 has micro-asperities to diffuse the laser light. The imaging surface 31 diffuses and reflects the laser light, which forms the display image 71 and impinges on the imaging surface 31, toward the concave mirror 40.

The concave mirror 40 is formed through vapor deposition of, for example, aluminum on a surface of a substrate made of, for example, glass. The concave mirror 40 has a reflection surface 41 that reflects the reflected laser light, which is reflected from the imaging surface 31 of the screen 30, onto the projection surface 91 of the windshield 90. A center portion of the reflection surface 41 is concave, i.e., is curved and is recessed in a direction away from the imaging surface 31 and the projection surface 91. The reflection surface 41 projects the display image 71 on the projection surface 91 such that the reflection surface 41 enlarges and reflects the display image 71, which is reflected by the imaging surface 31. The magnification of the display image 71, which is magnified by the curvature of the reflection surface 41, differs between the horizontal direction and the vertical direction of the display image 71. Specifically, the curvature of the reflection surface 41 in the horizontal direction is larger than the curvature of the reflection surface 41 in the vertical direction, so that the magnification (magnification scale) of the display image 71 in the horizontal direction is larger than the magnification (magnification scale) of the display image 71 in the vertical direction on the reflection surface 41.

Figure 4:
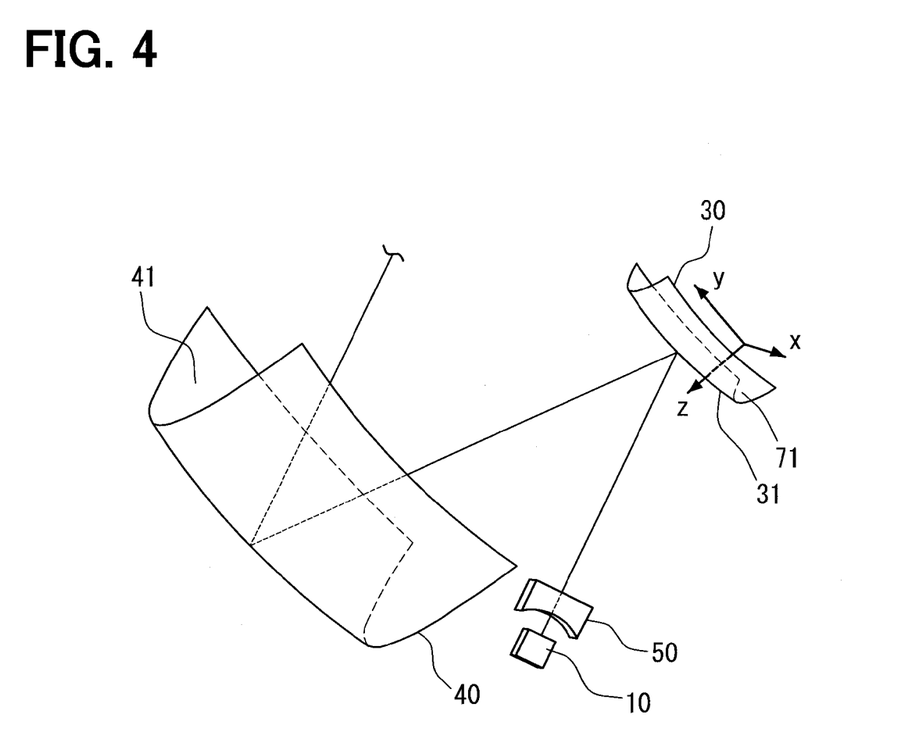
FIG. 4 is a diagram showing locations of the components of the head-up display apparatus of the embodiment.

Next, the characteristic features of the head-up display apparatus 100 of the embodiment will be described. As shown in FIGS. 2 and 4, the imaging surface 31 of the screen 30 is a curved convex surface, which is convex, i.e., is curved and is protruded toward the laser scanner 10 and the concave mirror 40. In addition, a free-form-surface lens (serving as a free-form-surface optical element) 50 is placed between the laser scanner 10 and the screen 30. Now, the imaging surface 31 and the free-form-surface lens 50 will be described in detail with reference to FIGS. 4 to 7E.

Figure 5:
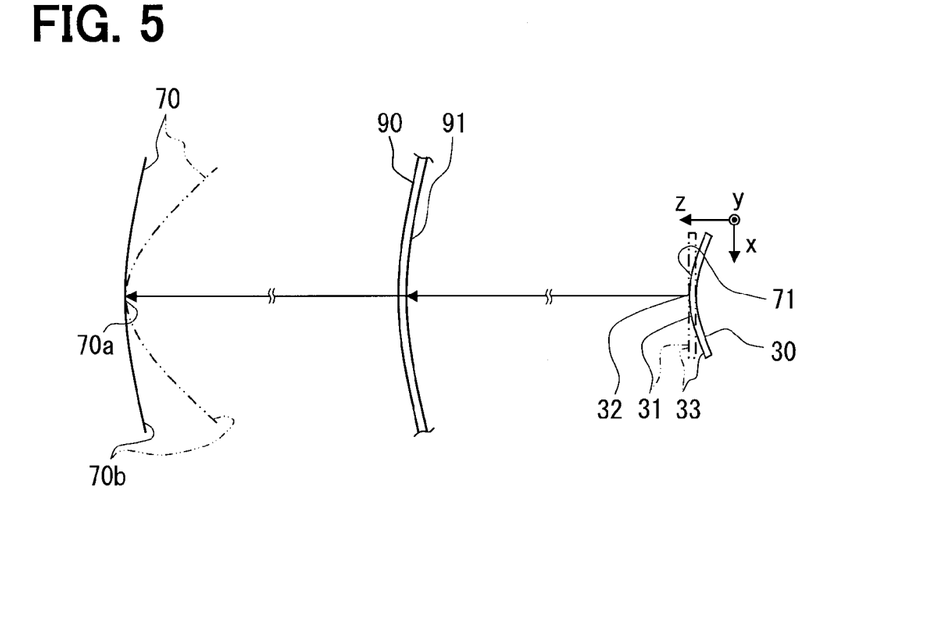
FIG. 5 is a diagram showing a convex imaging surface of a screen of the head-up display apparatus of the present embodiment along with a windshield of the vehicle and a virtual image viewed in a direction of an arrow V in FIG. 2.

As shown in FIGS. 4 and 5, the imaging surface 31 of the screen 30 is protruded toward the concave mirror 40 and is curved in the horizontal direction of the display image 71, which is formed on the imaging surface 31. Specifically, the imaging surface 31 of the screen 30 is convex, i.e., is protruded and is curved such that a center portion 32 of the imaging surface 31 is closer toward a side, in which the reflection surface 41 of the concave mirror 40 (and also the projection surface 91) is located, in comparison to an edge portion 33 of the imaging surface 31 in a light transmission direction (the direction of the z-axis) of the laser light. The shape of the imaging surface 31 is chosen to compensate (correct or limit) a curvature of field of the virtual image 70, which is caused by the curvature of the reflection surface 41 and the curvature of the projection surface 91. Here, it should be noted that the curvature of the imaging surface 31, the curvature of the projection surface 91 and the curvature of the virtual image 70 shown in the drawings are not in scale and are slightly exaggerated for the descriptive purpose.

Now, a three-dimensional deformation of the virtual image 70, which is caused by the curvature of field, will be described. The laser light, which is reflected by the imaging surface 31, is further reflected by the curved reflection surface 41 and the curved projection surface 91. Due to these reflections, an aberration is generated on the virtual image 70 by the curvature of field. Specifically, with reference to FIG. 5, the laser light, which is reflected by the edge portion 33 of the imaging surface 31, is imaged as the corresponding part (an edge portion 70b) of the virtual image 70 at a closer location that is closer to the windshield 90 in comparison to the laser light, which is reflected by the center portion 32 of the imaging surface 31. Therefore, in a case where the imaging surface is a planar surface, the virtual image 70 of the display image 71, which is visually recognized by the viewer, is curved such that the distance between the planar imaging surface (see the imaging surface 31 indicated by a dot-dot-dash line in FIG. 5) and the virtual image 70 is progressively reduced from a center portion 70a of the virtual image 70 to the edge portion 70b of the virtual image 70 (see a dot-dot-dash line in FIG. 5).

In view of the above point, according to the present embodiment, the imaging surface 31 is formed into the curved convex surface, which is three-dimensionally configured and compensates (corrects or limits) the curvature of field of the virtual image 70. Because of this shape of the imaging surface 31, a distance from the imaging surface 31 to the projection surface 91 in the light transmission direction of the laser light increases from the center portion 32 of the imaging surface 31 to the edge portion 33 of the imaging surface 31. Therefore, the imaging surface 31 has the adjusting function for adjusting the imaging location such that the imaging location of the edge portion 70b of the virtual image 70 is displaced away from the imaging surface 31 in the greater amount in comparison to that of the center portion 70a of the virtual image 70. The edge portion 70b of the virtual image 70, which is placed close to the projection surface 91 due to the curvature of field, is now further spaced from the projection surface 91 because of this adjusting function of the imaging surface 31. Thereby, the three-dimensional deformation of the virtual image 70 is reduced.

Figure 8:
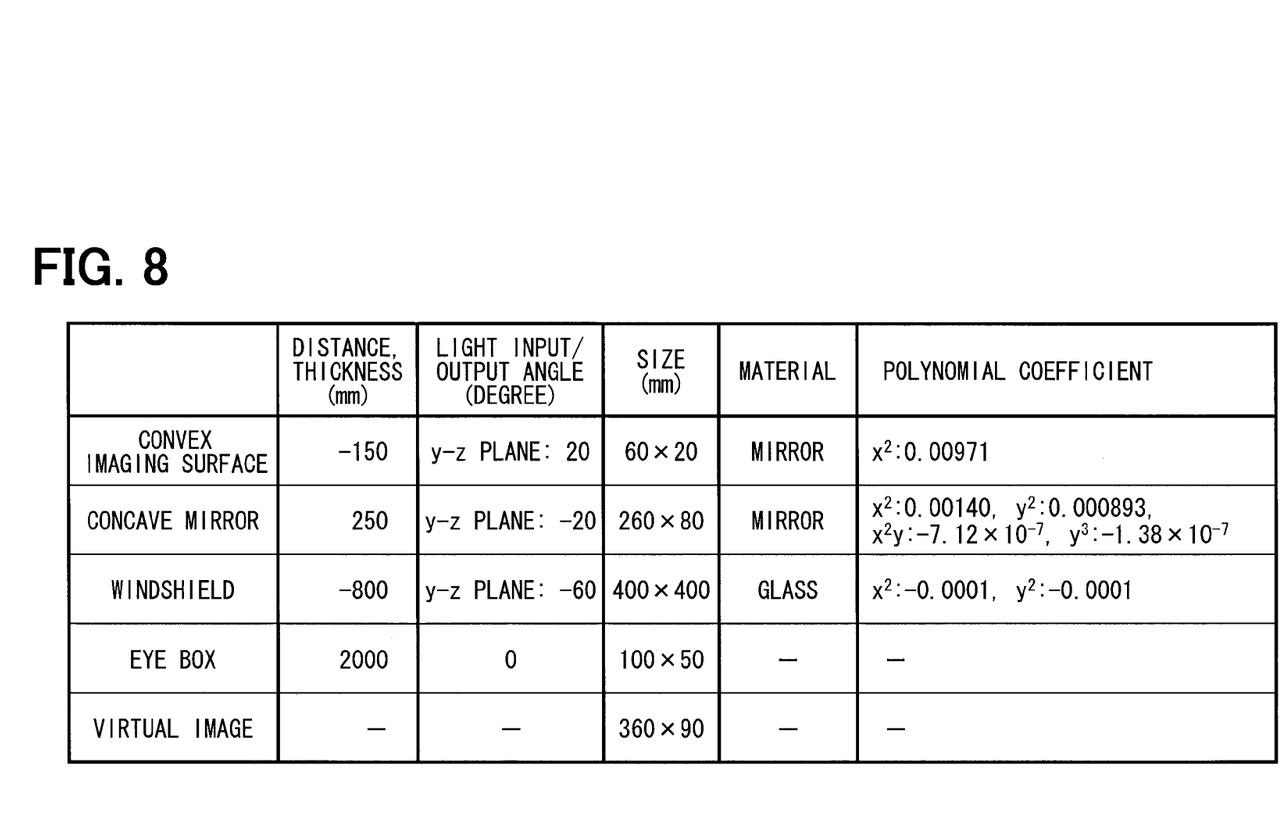
FIG. 8 is a diagram showing a specification of an apparatus having a convex imaging surface of the embodiment.
Figure 9:
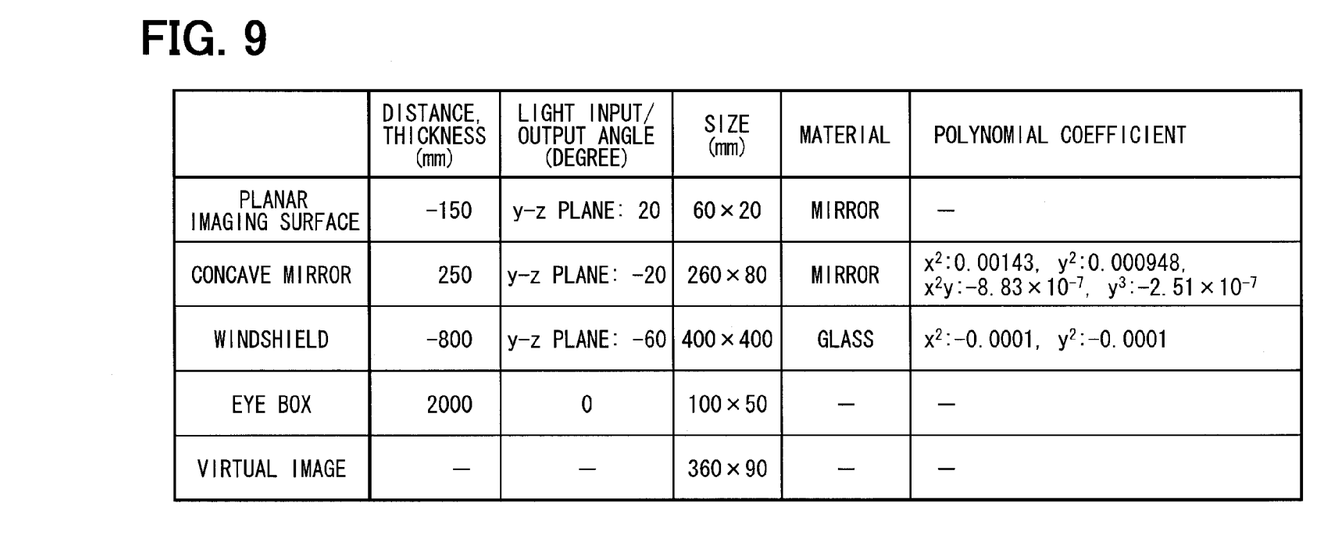
FIG. 9 is a diagram showing a specification of an apparatus having a planar imaging surface in a comparative example.

The effect of the imaging surface 31 on the virtual image 70 will be described in detail with reference to a result of a specific simulation, which is performed with the apparatus having the specification shown in FIG. 8. FIG. 8 shows the specification of the apparatus having the convex imaging surface 31. The imaging surface 31, which is indicated in FIG. 8, is a surface (quadric surface, more specifically a parabolic surface) that has a quadratic term in the horizontal direction (the x-axis). Therefore, the imaging surface 31 is curved parabolically in the horizontal direction. Furthermore, FIG. 9 indicates the specification of the comparative apparatus having the planar imaging surface. A spot diameter of the laser light of the virtual image 70, which is viewed from the eye point 61 in the eye box 60, is compared in FIG. 10 for the specification of FIG. 8 and the specification of FIG. 9. The spot diameter is a diameter of the laser light in a plane that is perpendicular to the light transmission direction of the laser light. When the spot diameter is reduced, the virtual image 70 is less moved in response to the positional change of the eye point 61 and thereby becomes clear.

Figure 10:
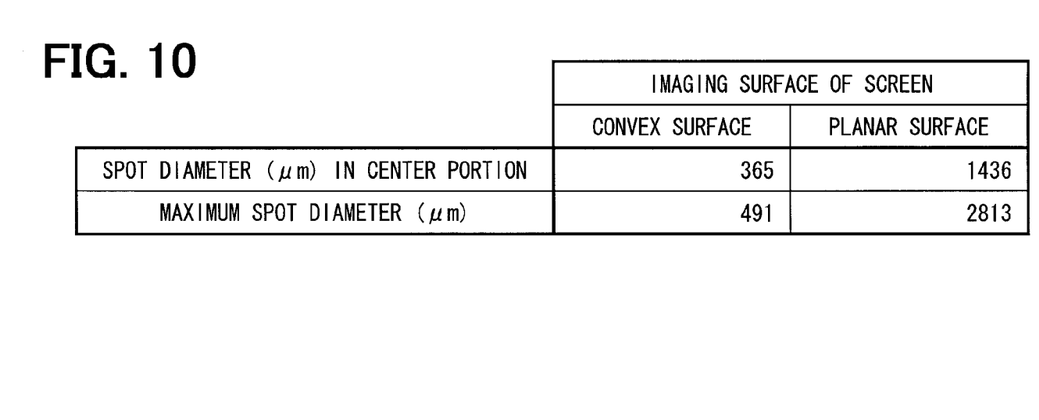
FIG. 10 is a diagram showing spot diameters of laser lights measured in a simulation using the apparatus of FIG. 8, which has the convex imaging surface, and spot diameters of laser lights measured in a simulation using the apparatus of FIG. 9, which has the planar imaging surface.

As indicated in FIG. 10, when the convex imaging surface (convex surface) 31 is used, the spot diameter of the laser light in the center portion of the display image 71 is reduced. In addition, the maximum spot diameter of the laser light, which is maximum throughout the entire range of the display image 71, is also reduced. Therefore, the virtual image 70 is less moved in response to the movement of the eye point 61 and thereby becomes clear.

Figure 6:
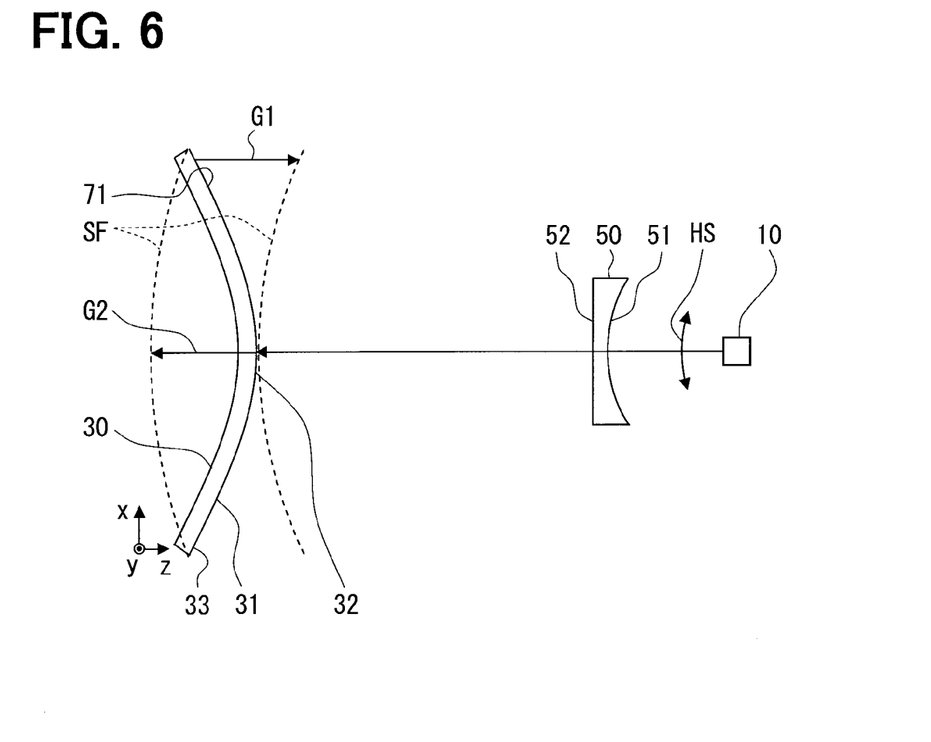
FIG. 6 is a diagram showing a free-form-surface lens along with the laser scanner and the imaging surface of the screen of the head-up display apparatus of the present embodiment.

Next, the function of the free-form-surface lens 50 will be described. As shown in FIG. 6, the focusing point of the laser light, which is projected by the laser scanner 10, is located along a concentric spherical surface SF (see a dotted line in FIG. 6), which is centered at the center of the laser scanner 10 (specifically, the center of the mirror portion 27 of the MEMS mirror 26). Therefore, at the time of executing the horizontal scanning of the laser light (see an arrow HS in FIG. 6), the focusing point of the laser light may substantially deviate from the imaging surface 31 depending on the shape of the convex imaging surface 31. Specifically, in a case where the focusing points of the laser lights are set to place the focusing point of the laser light onto the surface section of the center portion 32 of the imaging surface 31, the focusing point of the laser light in the area of the edge portion 33 may deviate from the imaging surface 31 on a side where the laser scanner 10 is located (see an arrow G1 in FIG. 6). In contrast, in another case where the focusing points of the laser lights are set to place the focusing point of the laser light onto the surface section of the edge portion 33, the focusing point of the laser light in the area of the center portion 32 may deviate from the imaging surface 31 on an opposite side, which is opposite from the laser scanner 10 (see an arrow G2 in FIG. 6). Thereby, the display image 71, which is formed on the imaging surface 31, may possibly become unclear.

In view of the above point, the free-form-surface lens 50 is placed between the laser scanner 10 and the imaging surface 31 according to the embodiment. The free-form-surface lens 50 is a lens, which has a light input surface 51 and a light output surface 52 and is made of optical glass. The light input surface 51 is formed as a free-form surface and is opposed to the laser scanner 10 in the light transmission direction of the laser light, i.e., is placed on the side where the laser scanner 10 is located. The light output surface 52 is formed as a planar surface. The free-form-surface lens 50 adjusts the focusing point of the laser light, which is projected by the laser scanner 10 onto the imaging surface 31. Specifically, the light input surface 51 of the free-form-surface lens 50 is recessed in the direction away from the laser scanner 10 and is curved in the horizontal direction. Therefore, the focusing point of the laser light, which forms a portion of the display image 71 at the horizontal edge portion 33 (i.e., the horizontal edge portion 33 that is located at the end of the display image 71 in the horizontal direction of the imaging surface 31), is displaced further away from the laser scanner 10. Thereby, even when the focusing point of the laser light is set to place the focusing point of the laser light onto the surface section of the center portion 32, the focusing point of the laser light in the area of the horizontal edge portion 33 of the display image 71 can be placed onto the imaging surface 31 by the free-form-surface lens 50. Because of the above function of the free-form-surface lens 50, the focusing point of the laser light can be substantially placed on the imaging surface 31 throughout the entire range of the imaging surface 31. Thereby, the display image 71 can be clearly formed throughout the entire range of the imaging surface 31. As a result, the virtual image 70 (see FIG. 5) of the display image 71, which is viewed by the viewer, becomes a more clear image throughout the entire range of the virtual image 70.

Figure 11:
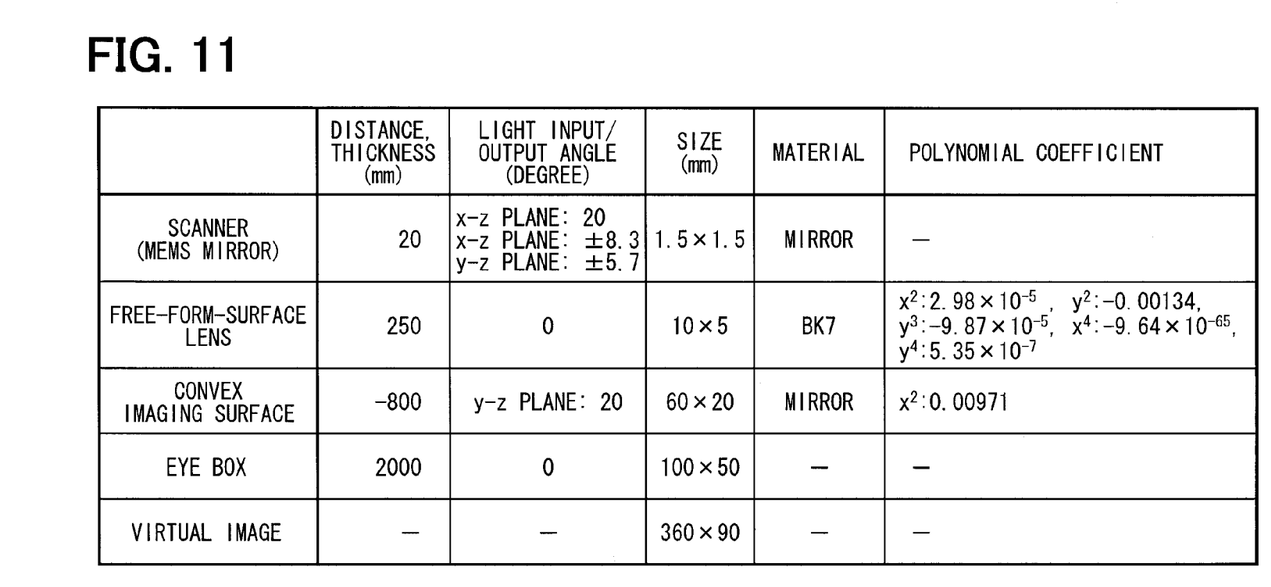
FIG. 11 is a diagram showing a specification of an apparatus having a free-form-surface lens of the present embodiment.

The effect of the free-form-surface lens 50 on the virtual image 70 will now be described in detail with reference to a result of a specific simulation, which is performed with the apparatus having the specification shown in FIG. 11. FIG. 11 shows the specification of the apparatus having the free-form-surface lens 50. The light input surface 51 of the free-form-surface lens 50, which is indicated in FIG. 11, has a quadratic term and a quartic term in the horizontal direction (the direction of the x-axis). In addition, the light input surface 51 has a quadratic term, a cubic term and a quartic term in the vertical direction (the direction of the y-axis).

In the free-form-surface lens 50 shown in FIG. 11, because of the even-order terms in the horizontal direction, the free-form-surface lens 50 is concave, i.e., is recessed and is curved in the horizontal direction. The focusing point of the laser light is adjusted onto the curved imaging surface 31. Furthermore, the free-form-surface lens 50 has the cubic term, which is the odd-order term, so that the lower half of the light input surface 51 in the vertical direction is convex, i.e., is curved and is protruded toward the laser scanner 10. In contrast, an upper half of the light input surface 51 in the vertical direction is concave, i.e., is curved and is recessed in a direction away from the laser scanner 10. Because of the above-described configuration of the light input surface 51, the laser light, which passes through the lower half of the light input surface 51 and reaches the lower half of the imaging surface 31, is focused at a location, which is closer to the laser scanner 10 in comparison to the case where the free-form-surface lens 50 is eliminated. In contrast, the laser light, which passes through the upper half of the light input surface 51 and reaches the upper half of the imaging surface 31, is focused at a location, which is further away from the laser scanner 10 in comparison to the case where the free-form-surface lens 50 is eliminated.

Figure 12:
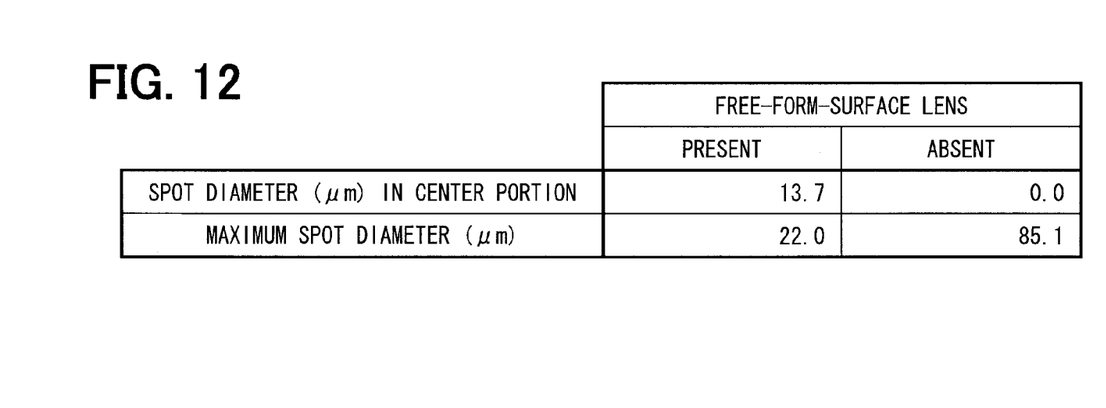
FIG. 12 is a diagram showing spot diameters of laser lights measured in a simulation using the apparatus of FIG. 11, which has the free-form-surface lens of the embodiment, and spot diameters of laser lights measured in a simulation using an apparatus, which does not have the free-form-surface lens.

In the present embodiment, the laser scanner 10 is placed at the lower side of the screen 30. Therefore, the distance from the laser scanner 10 to the screen 30 is increased toward the upper side in the vertical direction. Thus, since the focusing point of the laser light is adjusted by the free-form-surface lens 50, the focusing point of the laser light can be adjusted onto the imaging surface 31 throughout the entire range of the imaging surface 31 even in the case where the laser light is projected from the lower side along the y-z plane. FIG. 12 shows the comparison between the case where the free-form-surface lens 50 having the above function is provided and the case where the free-form-surface lens 50 is eliminated.

As indicated in FIG. 12, when the free-form-surface lens 50 is placed between the laser scanner 10 and the screen 30, the spot diameter of the laser light at the center portion of the display image 71 located in the center portion 32 of the screen 30 is slightly increased when the free-form-surface 50 lens is provided. Here, it should be noted that the indication of "0.0 μm" in FIG. 12 means that the spot diameter of the laser light in the center portion of the display image 71 in the absence of the free-form-surface lens is smaller than 0.1 μm but is larger than zero. The maximum spot diameter of the laser light in the entire range of the display image 71 is decreased when the free-form-surface lens 50 is provided. Therefore, the virtual image 70 is less moved in response to the movement of the eye point 61 and thereby becomes more clear throughout the entire range of the virtual image 70 in the presence of the free-form-surface lens 50.

Figure 7A:
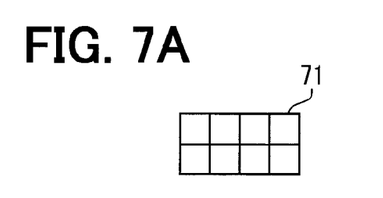
FIG. 7A is a diagram showing a display image formed on the imaging surface.
Figure 7B:
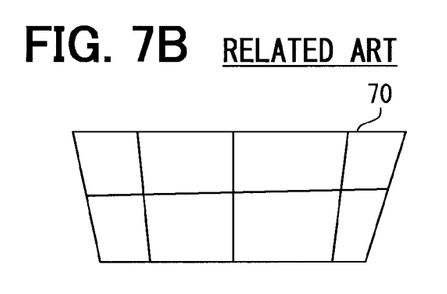
FIG. 7B is a diagram showing a shape of a virtual image in a case where the imaging surface is a planar surface.
Figure 7C:
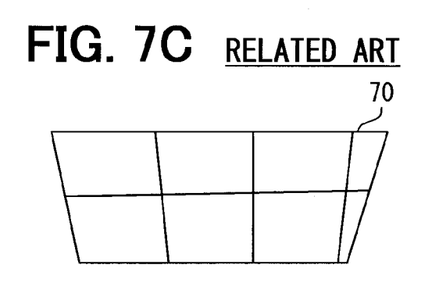
FIG. 7C is a diagram showing the virtual image of FIG. 7B, which is viewed by a viewer when an eye point of the viewer is moved in a right direction.

With reference to FIGS. 7A to 7E, the change of the virtual image 70 will be described for the case where the viewer moves the eye point 61 within the eye box 60. FIG. 7A shows the shape of the display image 71, which is configured generally into the elongated rectangular form (an oblong form) elongated in the direction of the axis x and is formed on the imaging surface 31. In the case where the imaging surface is the planar surface, the virtual image 70, which is viewed by the viewer, has a shape shown in FIG. 7B. The shape of this virtual image 70 is curved in the horizontal direction (see the virtual image 70 indicated by a dot-dot-dash line in FIGS. 2 and 5). Therefore, in the case where the viewer moves the eye point 61 in, for example, the right direction, the virtual image 70 has the shape shown in FIG. 7C. Specifically, the right half of the virtual image 70 is compressed in the horizontal direction, and the left half of the virtual image 70 is expanded in the horizontal direction. In addition, since the virtual image 70 is curved, a distance between the virtual image 70 and the eye point 61 is changed in response to the movement of the eye point 61 in the horizontal direction. Thus, when the viewer moves the eye point 61, the virtual image 70 approaches the viewer. As discussed above, the shape and the location of the virtual image 70 are significantly changed in response to the movement of the eye point 61.

Figure 7D:
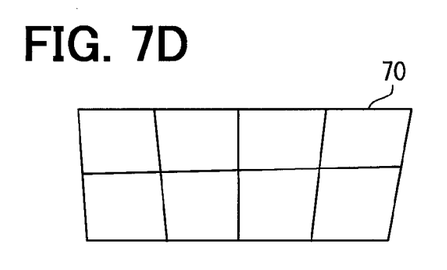
FIG. 7D is a diagram showing a shape of the virtual image in a case where the imaging surface is a convex surface.
Figure 7E:
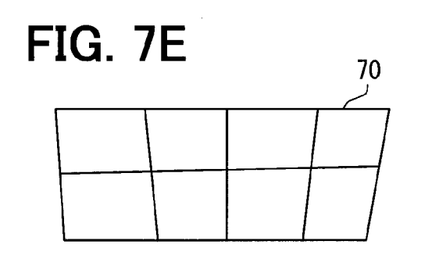
FIG. 7E is a diagram showing the virtual image of FIG. 7D, which is viewed by the viewer when the eye point of the viewer is moved in the right direction.

FIG. 7D shows the virtual image 70, which is formed on the convex imaging surface 31. In the virtual image 70, which is shown in FIG. 7D, the curvature of the virtual image 70 in the horizontal direction is reduced (see the virtual image 70 indicated by a solid line in FIGS. 2 and 5). In the present embodiment, in the case where the viewer moves the eye point 61 in the right direction, the virtual image 70 has the shape shown in FIG. 7E. In the case of FIG. 7E, the compression of the right half of the virtual image 70 of FIG. 7E, which is located on the right side in the horizontal direction, and the expansion of the left half of the virtual image 70 of FIG. 7E, which is located on the left side in the horizontal direction, are reduced in comparison to the virtual image 70 of FIG. 7C. In addition, since the curvature of the virtual image 70 is reduced, the change in the distance between the virtual image 70 and the eye point 61 caused by the movement of the eye point 61 in the horizontal direction is more limited.

As discussed above, in the present embodiment, even when the viewer moves the eye point 61 within the eye box 60, the change in the shape of the virtual image 70 and the change in the position of the virtual image 70 are both limited. Therefore, the display quality of the display image 71, which is displayed as the virtual image 70, can be improved.

Furthermore, even in the present embodiment, in which the imaging surface 31 is configured to be convex to reduce the three-dimensional deformation of the virtual image 70, the free-form-surface lens 50 can adjust the focusing point of the laser light, and thereby the loss of the clearness of the virtual image 70 is limited to provide the more clear virtual image 70. Therefore, the display quality of the display image 71 can be reliably improved.

Furthermore, like in the present embodiment, in which the display image 71 is enlarged by the concave mirror 40, the three-dimensional deformation of the virtual image 70, which is caused by the curvature of field, may be enlarged. However, the imaging surface 31 can reduce the enlarged three-dimensional deformation of the enlarged virtual image 70, by the adjusting function of the imaging surface 31. Therefore, the viewer can view the improved virtual image 70, which is enlarged to enable the easy recognition of the virtual image by the viewer and in which the shape change and the positional change of the virtual image 70 are limited. Thus, the display quality of the display image 71 can be further improved.

Furthermore, in the present embodiment, the reflection surface 41 of the concave mirror 40 is configured to enlarge the display image 71 such that the enlargement (magnification) of the display image 71 in the horizontal direction (the lateral direction or the first direction) is larger than enlargement (magnification) of the display image 71 in the vertical direction (top-to-bottom direction or the second direction). In such an instance, the deformation of the virtual image 70 in the horizontal direction caused by the curvature of filed may possibly become prominent due to the increased enlargement of the virtual image 70 in the horizontal direction. Therefore, the imaging surface 31 is configured to be the convex surface, which is curved in the horizontal direction. Thereby, the adjusting function of the imaging surface 31 discussed above can effectively reduce the prominent horizontal deformation of the display image 71. In addition, the imaging surface 31, which has the simple curved shape that is curved in the horizontal direction, can be easily formed, so that the screen 30 can be reliably provided. Thereby, the implementability of the improved display quality of the display image 71 can be increased.

In addition, according to the present embodiment, the display image 71, which is formed on the imaging surface 31 through the scanning of the high power laser light, has the high contrast. Thus, the high visibility of the virtual image 70 can be implemented. As discussed above, the good display quality can be implemented by the head-up display apparatus 100 of the present embodiment, which enables the viewer to view the virtual image 70 having the high visibility and the reduced deformation.

Furthermore, in the present embodiment, due to the combination of the free-form-surface lens 50 with the laser scanner 10, the display image 71, which is formed on the imaging surface 31, becomes more clear with the aid of the focusing point adjusting function of the free-form-surface lens 50 discussed above. Thus, the viewer can more easily recognize the virtual image 70 of the display image 71, in which the deformation is reduced. As a result, when the laser scanner 10 is combined with the free-from-surface lens 50, the display quality of the display image 71 can be substantially improved.

Furthermore, in the present embodiment, the light input surface 51 of the free-form-surface lens 50 has the adjusting function for adjusting the focusing point of the laser light on the imaging surface 31. The light input surface 51 is formed as the curved surface, so that the incident angle (input angle) of the laser light on the light input surface 51 becomes the angle that is equal to or close to the right angle. Therefore, the chromatic aberration of the laser light, which occurs at the time of passing through the free-form-surface lens 50, can be reduced.

Furthermore, due to the use of the reflective screen 30, the portion of the light path of the laser light is bent backward and forward in the inside of the head-up display apparatus 100. Thus, the size of the head-up display apparatus 100 can be reduced to enable the installation of the head-up display apparatus 100 in the instrument panel while providing the required distance of the light path.

In the present embodiment, the laser scanner 10 serves as a projector of the present disclosure. The screen 30 serves as a screen member of the present disclosure. The concave mirror 40 serves as a magnifying mirror (also known as a magnifier) of the present disclosure. The free-form-surface lens 50 servers as a focusing point adjusting optical system (or the free-form-surface optical element of the focusing point adjusting optical system) of the present disclosure. The eye box 60 serves as a viewing area of the present disclosure. The windshield 90 serves as a display member of the present disclosure.

The present disclosure has been described with respect to the above embodiment. However, the present disclosure is not limited to the above embodiment, and the above embodiment may be modified within a spirit and scope of the present disclosure.

For instance, in the above embodiment, the windshield 90 is used as the display member of the present disclosure, onto which the display image 71 is projected at the head-up display apparatus 100. However, the display member, on which the projection surface is formed, is not limited to the windshield 90. For example, with reference to FIG. 2, the display member may be a combiner (separate member) 92 having a projection surface 93. This combiner 92 is made of a light transmissive material and is placed adjacent to, more specifically attached to the interior surface of the windshield 90 located inside of the passenger compartment of the vehicle.

Furthermore, the combiner 92 may be formed separately or provided separately from the windshield 90. In the case where the combiner 92 is used as the display member, the concave mirror, which serves as the magnifying mirror, may be eliminated. In a case where the projection surface 93 of the combiner 92 is a curved concave surface, the virtual image, which is viewed by the driver (viewer), is an enlarged image that is enlarged from the display image formed on the imaging surface. Therefore, in such a case, the magnifying mirror can be eliminated.

Furthermore, in the case where the combiner 92, which is formed separately from the windshield 90, is used as the display member, the combiner 92 may be configured into a planar form. In addition, in a case where the desired magnification can be obtained with the magnifying mirror, it may not be required to have the enlarging function, which is achieved by the curvature of the projection surface. Thereby, the case, in which the display image is projected onto the planar projection surface, is possible.

In the above embodiment, the curvature of the reflection surface 41 and the curvature of the projection surface 91 enable the driver (viewer) to see the virtual image 70 of the display image 71, which is enlarged to have the larger magnification in the horizontal direction that is larger than the magnification in the vertical direction. Thereby, the imaging surface 31 is curved only in the horizontal direction to effectively limit the deformation of the virtual image 70 in the horizontal direction to provide the required angle of view in the horizontal direction. However, the magnification in the horizontal direction and the magnification in the vertical direction can be appropriately changed depending on the requirement (or a need). Thus, in the case where the angle of view is required in the vertical direction, the imaging surface may be curved in the vertical direction in addition to the horizontal direction. Specifically, in such a case, it is desirable that the polynomial (see FIG. 8), which defines the shape of the imaging surface, includes the even-order term (e.g., the quadratic term) of y. Furthermore, in such a case, the shape of the imaging surface may correspond to the corresponding surface contour, i.e., the corresponding surface curvature of the projection surface 91 in the horizontal direction and the corresponding surface curvature of the projection surface 91 in the vertical direction. The above modification is also applicable to the reflection surface 41 of the concave mirror 40.

In the above embodiment, the reflective screen 30 is used. However, as long as the screen is configured to have the convex surface, the screen is not limited to the reflective type. For example, the screen 30 may be formed as a transmission screen, which is made of a light transmissive material. In such a case, the laser scanner projects the laser light, which forms the display image, from the opposite side of the convex imaging surface of the screen, which is opposite from the concave mirror.

In the above embodiment, the imaging surface 31 of the screen 30 is the curved parabolic surface, which has the quadratic term. However, the shape of the windshield and the shape of the projection surface may vary depending on the type of the vehicle, on which the head-up display apparatus is installed. Therefore, in a case where the windshield and the projection surface are tilted relative to the vertical direction, it is desirable that the polynomial (see FIG. 8), which defines the shape of the imaging surface, includes the odd-order term (e.g., the cubic term) of y to compensate (correct or limit) the effect of the tilt of the projection surface.

In the above embodiment, the free-form-surface lens 50, which is placed between the laser scanner 10 and the screen 30, serves as the focusing point adjusting optical system (or the free-form-surface optical element of the focusing point adjusting optical system) of the present disclosure. Alternatively, in place of the free-form-surface lens 50, a free-form-surface mirror may be used as the focusing point adjusting optical system (or the free-form-surface optical element of the focusing point adjusting optical system) of the present disclosure. In the case where the free-form-surface mirror is used, the chromatic aberration, which is generated in the laser light, can be limited at the time of adjusting the focusing point of the laser light. Further alternatively, for example, multiple lenses and/or mirrors may be used to form the focusing point adjusting optical system of the present disclosure. Further alternatively, the condenser lens 25 of the laser scanner 10 may be formed as a part of the focusing point adjusting optical system of the present disclosure.

In the above embodiment, the free-form-surface lens 50 has the light output surface 52, which is formed as the planar surface, and the light input surface 51, which is formed as the free-form surface. Alternatively, the light output surface of the free-form-surface lens may have a light output surface, which is formed as a free-form surface, and a light input surface, which is formed as a planar surface. Further alternatively, a light input surface and a light output surface of the free-form-surface lens may be formed as free-form-surfaces, respectively. Further alternatively, the free-from-surface lens may have a light input surface, which is formed as a simple concave surface or a simple convex surface, and a light output surface, which is formed as a simple concave surface or a simple convex surface.

In the above embodiment, as discussed with reference to FIG. 6, the focusing points of the laser lights, which are initially set to place the focusing point of the laser light onto the center portion 32 of the imaging surface 31 while displacing the focusing point of the laser light away from the edge portion 33 of the imaging surface 31 on the side of the imaging surface 31 where the laser scanner 10 is located, are adjusted by the function of the free-form-surface lens 50 such that the focusing point of the laser light, which is initially displaced away from the edge portion 33 of the imaging surface 31, is placed onto the edge portion 33 of the imaging surface 31, so that the display image 71, which is formed on the imaging surface 31, becomes more clear throughout the entire range of the display image 71. However, this may be modified in any other appropriate manner. For example, the focusing points of the laser lights, which are initially set to place the focusing point of the laser light onto the edge portion 33 of the imaging surface 31 while displacing the focusing point of the laser light away from the center portion 32 of the imaging surface 31 on the side of the imaging surface 31 opposite from the laser scanner 10, may be adjusted by the function of the free-form-surface lens 50 such that the focusing point of the laser light, which is initially displaced away from the center portion 32 of the imaging surface 31, is placed onto the center portion 32 of the imaging surface 31 by displacing it toward the laser scanner 10, so that the display image 71, which is formed on the imaging surface 31, becomes more clear throughout the entire range of the display image 71. Further alternatively, the focusing points of the laser lights, which are initially set to place the focusing point of the laser light onto an intermediate location of the imaging surface 31 between the center portion 32 and the edge portion 33 while displacing the focusing point of the laser light away from the center portion 32 and displacing the focusing point of the laser light away from the edge portion 33, may be adjusted by the function of the free-form-surface lens 50 such that the focusing point of the laser light, which is initially displaced away from the center portion 32, is placed onto the center portion 32 by displacing it toward the laser scanner 10, and the focusing point of the laser light, which is initially displaced away from the edge portion 33, is placed onto the edge portion 33 by displacing it away from the laser scanner 10, so that the display image 71, which is formed on the imaging surface 31, becomes more clear throughout the entire range of the display image 71.

In the above embodiment, the optical axis of the laser light, which is transmitted from the laser scanner 10 to the imaging surface 31, is along the y-z plane. Because of this arrangement, the polynomial (see FIG. 11), which defines the shape of the light input surface 51 of the free-form-surface lens 50, includes the odd-order term (specifically, the cubic term) of y. However, the relative position of the laser scanner with respect to the imaging surface needs to be changeable in an appropriate manner depending on the available space in the inside of the instrument panel and the shape of the windshield of the type of the vehicle, in which the head-up display apparatus is installed. Therefore, it is desirable that the polynomial, which defines the shape of the surface of the free-form-surface lens, includes the term(s), which corresponds to the installation location of the laser scanner in the vehicle. Specifically, in a case where the optical axis of the laser light, which is transmitted from the laser scanner to the imaging surface, is along an x-z plane (a plane defined by the x-axis and the z-axis), i.e., in a case where the laser light is projected onto the projecting surface from a lateral side of the imaging surface, it is desirable that the polynomial, which defines the shape of the surface of the free-form-surface lens, includes the odd-order term of x. Furthermore, in a case where the laser light is projected onto the projecting surface from a diagonally lower side of the projecting surface, it is desirable that the polynomial, which defines the shape of the surface of the free-form-surface lens, includes both of the odd-order term of x and the odd-order term of y.

In the above embodiment, the laser scanner 10, which forms the display image 71 on the imaging surface 31 through the scanning of the laser light (i.e., the steering of the laser light with the mirror portion 27), is used as the projector of the present disclosure. However, various other types of projectors may be used as the projector of the present disclosure as long as such a projector can project the light, which forms the display image on the imaging surface. Specifically, for example, a projector, which includes a liquid crystal on silicon (LCOS) or a digital mirror device (DMD) together with a light source and an optical system (e.g., a lens(es)), may be used as a the projector of the present disclosure.

The LCOS is formed by holding, i.e., clamping a liquid crystal layer between a silicon substrate and a light transmissive substrate. The liquid crystal layer forms a plurality of arrayed pixels. A circuit, which drives the liquid crystal, and an electrode, which reflects the light, are provided at the silicon substrate. The light of the light source, which enters the LCOS through the light transmissive substrate, passes through the liquid crystal layer and is reflected by the electrode provided at the silicon substrate, so that the reflected light exits the LCOS. When an original image, which later becomes the display image, is formed in the liquid crystal layer, the projector having such an LCOS can project the light that forms the display image on the imaging surface.

The DMD is formed by arraying a large number of micro-mirrors on a substrate. Each of the micro-mirrors forms a corresponding pixel. A tilt angle of each micro-mirror can be changed based on a control signal. The light of the light source, which enters the DMD, is reflected by each micromirror. The DMD can form the image by controlling the tilt angle of each of the micro-mirrors. Thus, the projector, which has the DMD, can project the light, which forms the display image on the imaging surface.

In the above embodiment, the MEMS mirror 26, which has the multiple movable pivots, i.e., the high speed pivots 27a and the low speed pivots 28a, are provided to scan, i.e., steer the laser light. However, the laser scanner may have a plurality of MEMS mirrors, each of which has a single movable pivot (or two pivots that extend only in a corresponding one of the horizontal direction and the vertical direction). Specifically, a first MEMS mirror, which scans, i.e., steers the laser light in the horizontal direction, and a second MEMS mirror, which scans, i.e., steers the laser light in the vertical direction, may be combined to implement the function of the MEMS mirror 26 of the above embodiment, which forms the two-dimensional image.

In the above embodiment, the present disclosure is applied to the head-up display apparatus, which projects the display image 71 on the windshield 90 of the vehicle (e.g., the automobile). However, the present disclosure can be applied to various types of head-up displays, which are adapted to be installed in various other types of transportation apparatuses (e.g., other types of vehicles, such as airplanes, ships, trains) and to enable a viewer to view the virtual image 70 of the display image 71.

Additional advantages and modifications will readily occur to those skilled in the art. The present disclosure in its broader terms is therefore not limited to the specific details, representative apparatus, and illustrative examples shown and described.

What is claimed is:

1. A head-up display apparatus, which projects a display image onto a projection surface of a display member, which is formed as a concave surface, to enable a viewer to view a virtual image of the display image from a predetermined viewing area, the head-up display apparatus comprising:
   a screen member that includes an imaging surface, on which the display image to be projected onto the projection surface is formed at time of projecting the display image onto the projection surface, wherein the imaging surface is formed as a convex surface that corrects a curvature of field of the virtual image, which is caused by a curvature of the projection surface;
   a projector that projects a light from a diagonally lower side of the imaging surface to form the display image on the imaging surface; and
   a focusing point adjusting optical system that includes a free-form-surface lens, which is placed at the diagonally lower side of the imaging surface, wherein:
   the focusing point adjusting optical system adjusts a focusing point, in which the light projected from the projector is focused, to place the focusing point on the imaging surface;
   a shape of a light input surface of the free-form-surface lens along a predetermined direction, which is perpendicular to an optical axis of the light entering the light input surface, is defined by a polynomial that includes a cubic term, so that a lower half of the light input surface in the predetermined direction is curved and is protruded toward the projector to focus the light, which passes through the lower half of the light input surface and reaches a lower half of the imaging surface, at a location, which is closer to the projector, and an upper half of the light input surface in the predetermined direction is curved and recessed in a direction away from the projector to focus the light, which passes through the upper half of the light input surface and reaches an upper half of the imaging surface, at a location, which is further away from the projector.

2. The head-up display apparatus according to claim 1, wherein the projection surface, which is formed as the concave surface, is curved and is recessed in a direction away from the predetermined viewing area.

3. The head-up display apparatus according to claim 1, wherein the imaging surface is curved and is protruded toward the projector.

4. The head-up display apparatus according to claim 1, wherein the imaging surface is three-dimensionally curved in both of a first direction and a second direction, which are perpendicular to each other, based on a curvature of the projection surface in the first direction and a curvature of the projection surface in the second direction.

5. The head-up display apparatus according to claim 1, further comprising a magnifying mirror that includes a reflection surface, which is formed as a concave surface and projects the display image onto the projection surface at time of projecting the display image onto the projection surface by reflecting the display image formed on the imaging surface upon enlarging the display image by the reflection surface, wherein the imaging surface is formed as the convex surface that limits the curvature of field of the virtual image, which is caused by a curvature of the reflection surface.

6. The head-up display apparatus according to claim 5, wherein the reflection surface is curved and is recessed in a direction away from the imaging surface.

7. The head-up display apparatus according to claim 5, wherein the reflection surface is three-dimensionally curved in both of a first direction and a second direction, which are perpendicular to each other, based on a curvature of the projection surface in the first direction and a curvature of the projection surface in the second direction.

8. The head-up display apparatus according to claim 5, wherein:
   the display image projected onto the display member is elongated in a first direction rather than a second direction of the display image, which is perpendicular to the first direction;
   the reflection surface is formed as the concave surface, which enlarges the display image projected onto the display member such that a magnification of the display image in the first direction is larger than a magnification of the display image in the second direction; and
   the imaging surface is formed as the convex surface, which is more curved in the first direction than the second direction to limit the curvature of field of the virtual image in the first direction.

9. The head-up display apparatus according to claim 1, wherein:
   the projector projects a laser light as the light; and
   the projector scans the laser light on the imaging surface to form the display image on the imaging surface.

10. The head-up display apparatus according to claim 1, wherein:
    the head-up display apparatus is for a vehicle; and
    the projection surface of the display member is one of:
    a surface of a windshield of the vehicle; and
    a surface of a separate member that is formed separately from the windshield and is placed adjacent to an interior surface of the windshield.

* * * * *